(12) United States Patent
Rudenko et al.

(10) Patent No.: US 8,364,810 B2
(45) Date of Patent: Jan. 29, 2013

(54) METHOD, SYSTEM AND APPARATUS FOR MANAGEMENT OF PUSH CONTENT WHEN CHANGING COMPUTING DEVICES

(75) Inventors: Vladlen Rudenko, Kitchener (CA); John Ivan Svazic, Cambridge (CA); Cassidy Paul Gentle, Kitchener (CA)

(73) Assignee: Research In Motion Limited, Waterloo (CA)

( * ) Notice: Subject to any disclaimer, the term of this patent is extended or adjusted under 35 U.S.C. 154(b) by 443 days.

(21) Appl. No.: 12/712,771

(22) Filed: Feb. 25, 2010

(65) Prior Publication Data

US 2011/0113135 A1   May 12, 2011

Related U.S. Application Data

(60) Provisional application No. 61/258,793, filed on Nov. 6, 2009.

(51) Int. Cl.
*G06F 15/173* (2006.01)
*G06F 15/16* (2006.01)

(52) U.S. Cl. ........................... 709/224; 709/219

(58) Field of Classification Search .................. None
See application file for complete search history.

(56) References Cited

U.S. PATENT DOCUMENTS

| | | | |
|---|---|---|---|
| 7,353,295 | B1 | 4/2008 | Crow et al. |
| 2002/0029273 | A1 | 3/2002 | Haroldson et al. |
| 2002/0143964 | A1 | 10/2002 | Guo et al. |
| 2002/0194325 | A1 | 12/2002 | Chmayteli et al. |
| 2002/0197991 | A1* | 12/2002 | Anvekar et al. ........... 455/432 |
| 2003/0045273 | A1 | 3/2003 | Pyhalammi et al. |
| 2003/0066065 | A1 | 4/2003 | Larkin |
| 2004/0083317 | A1 | 4/2004 | Dickson et al. |
| 2004/0122907 | A1 | 6/2004 | Chou et al. |
| 2005/0132083 | A1 | 6/2005 | Raciborski et al. |
| 2005/0163072 | A1 | 7/2005 | Park et al. |
| 2005/0201320 | A1 | 9/2005 | Kiss et al. |
| 2006/0129638 | A1* | 6/2006 | Deakin ........................ 709/203 |
| 2007/0268515 | A1 | 11/2007 | Freund et al. |
| 2008/0066190 | A1 | 3/2008 | Shu et al. |
| 2008/0091835 | A1 | 4/2008 | Yuan |
| 2008/0140650 | A1 | 6/2008 | Stackpole |
| 2008/0256607 | A1 | 10/2008 | Janedittakarn et al. |
| 2009/0069001 | A1 | 3/2009 | Cardina et al. |
| 2009/0112981 | A1 | 4/2009 | Markovich |

(Continued)

FOREIGN PATENT DOCUMENTS

| | | |
|---|---|---|
| EP | 1098489 A2 | 5/2001 |
| EP | 1865744 A1 | 12/2007 |

(Continued)

OTHER PUBLICATIONS

European Patent Application No. 10154679.4 Search Report mailed Oct. 21, 2010.

(Continued)

*Primary Examiner* — John B. Walsh
(74) *Attorney, Agent, or Firm* — Perry + Currier Inc.; Kristjan Spence

(57) ABSTRACT

A method, system and apparatus for management of push content when changing computing devices is provided. In an example embodiment, a computing device is configured to maintain an absolute identifier of the device that remains unchangeable, and a relative identifier that can be changed. The processor of the device is configured to ascertain if the relative identifier has been changed, and accordingly notify any network infrastructure that is configure to send push content to the device to cease delivery of such push content.

20 Claims, 10 Drawing Sheets

U.S. PATENT DOCUMENTS

| | | | |
|---|---|---|---|
| 2010/0010899 A1 | 1/2010 | Lambert et al. | |
| 2010/0180016 A1 | 7/2010 | Bugwadia et al. | |
| 2010/0317320 A1* | 12/2010 | Sakargayan | 455/410 |
| 2011/0035589 A1 | 2/2011 | Butcher et al. | |

FOREIGN PATENT DOCUMENTS

| | | |
|---|---|---|
| WO | 01/95587 A2 | 12/2001 |
| WO | 2005/015935 A1 | 2/2005 |
| WO | 2007/111598 A1 | 10/2007 |

OTHER PUBLICATIONS

White Paper, K800, Published by Sony Ericsson Mobile Communications AB, Feb. 2006.

Canadian Patent Application No. 2682833 Office Action dated Jan. 23, 2012.

Related European Patent Application No. 10165549.6 Search Report dated Jun. 8, 2011.

European Patent Application No. EP 10 16 6650 Search Report mailed Nov. 22, 2010.

Pdf document: Mobile Java Push; Mar. 2009 downloaded from http://web.archive.org/web/20090511131417/http://labs.ericsson.com/apis/mobile-java-push/.

YouTube video—Mobile Java Push—Quick Start; Uploaded by MobileJavaPush on Mar. 31, 2009.

* cited by examiner

METHOD, SYSTEM AND APPARATUS FOR MANAGEMENT OF PUSH CONTENT WHEN CHANGING COMPUTING DEVICES

PRIORITY CLAIM

The present specification claims priority from US Provisional Patent Application 61/258,793 filed Nov. 6, 2009, the contents of which are incorporated herein by reference.

FIELD

The present specification relates generally to telecommunications and more particularly relates to a method, system and apparatus for management of push content when changing computing devices.

BACKGROUND

Computing devices that access telecommunication networks frequently connect to those networks via one or more network intermediaries, such as a mobile telecommunication carrier, an enterprise, or a manufacturer of the computing device. Having connected to the network, either directly or through one or more intermediaries, such computing devices may subscribe to one or more host services that push content to the computing device. From time-to-time such computing devices also change hands.

DETAILED DESCRIPTION OF THE EXAMPLE EMBODIMENTS

Figure 1:
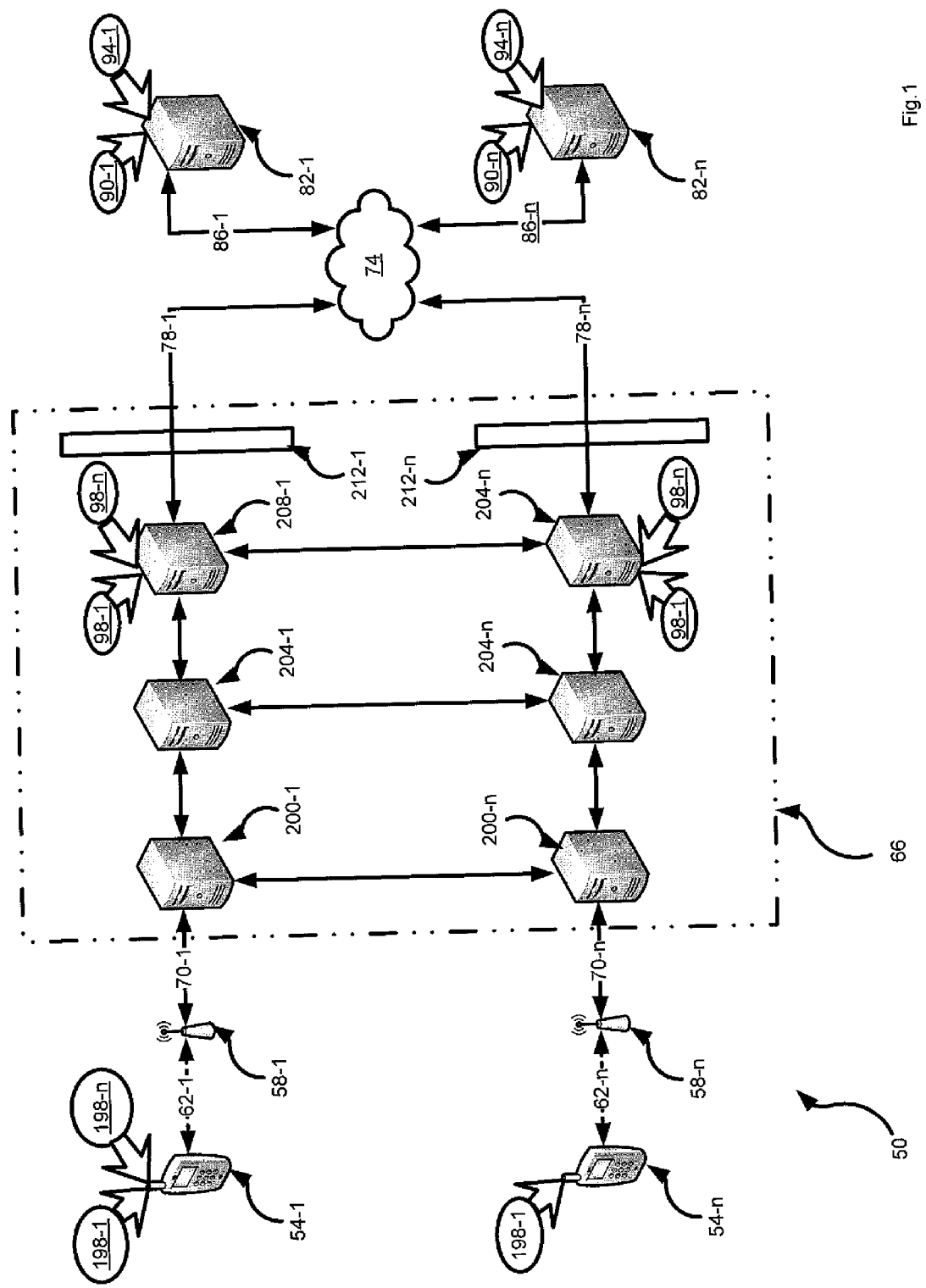
FIG. 1 is a schematic representation of a system for management of push content.

An aspect of this specification provides a method for management of push content on a computing device comprising: determining, at a processor of the computing device, that a relative device identifier associated with the computing device has changed; receiving, at the processor, content subscription information; the content subscription information identifying content to be pushed to the computing device via a link connected to the computing device; the content subscription information maintained within at least one storage device of the computing device; sending at least one message to a network component instructing the network component to unsubscribe the computing device from the content to be pushed; the message identifying an absolute identifier associated with the device and the content.

The method can further comprise: generating a local message on an output mechanism of the device requesting input to identify whether to re-subscribe to the content; on receiving an affirmative response to the local message via an input mechanism of the device, initiating a subscription process to the network component to re-subscribe the computing device to receive the content to be pushed. The method can further comprise: on receiving a negative response to the local message via the input device, uninstalling an application from the storage device; the application configured to receive the content via the network component and to generate the content on the output mechanism.

The network component can be a policy server in an intermediation infrastructure; the policy server connected to a content server for hosting the content; the policy server configured to maintain a policy indicating whether delivery of the push content to the computing device is permitted.

The network component can be a content server for hosting the content; the content server configured to maintain a policy indicating whether delivery of the push content to the computing device is permitted.

The determining can be performed by detecting whether a removable information module within the computing device has been changed. The removable information module can be a Subscriber Information Module (SIM) card.

Another aspect of the specification comprises a computing device comprising: storage configured to maintain a relative device identifier; the relative device identifier changeable; the storage configured to maintain an absolute device identifier that is not changeable; the storage further configured to maintain content subscription information identifying content to be pushed to the computing device via a link connectable to the computing device; a processor connected to the storage; the processor configured to determine that the relative device identifier has changed; the processor further configured to receive the content subscription information; the processor further configured to send to at least one message to network component connectable to the link; the message instructing the network component to unsubscribe the computing device from the content to be pushed; the message identifying the absolute device identifier.

An another aspect of this specification comprises a system for management push content comprising: a network component for pushing content and connectable to a network; a computing device connectable to the server via the network; the computing device comprising storage configured to maintain a relative device identifier; the relative device identifier changeable; the storage configured to maintain an absolute device identifier that is not changeable; the storage further configured to maintain content subscription information identifying content to be pushed to the computing device from the network component; the computing device comprising connected to the storage; the processor configured to determine that the relative device identifier has changed; the processor further configured to receive the content subscription information; the processor further configured to send to at least one message to the network component via the network; the message instructing the network component to unsubscribe the computing device from the content to be pushed; the message identifying the absolute device identifier.

Referring now to FIG. 1, a system for management of push applications is indicated generally at 50. System 50 comprises a plurality of computing devices 54-1 ... 54-$n$. (Hereafter, generically these are referred to as computing device 54, and collectively, computing devices 54. This nomenclature is used elsewhere herein.) Each computing device 54 is configured to connect to one or more wireless access points 58 via a wireless link 62.

Figure 2:
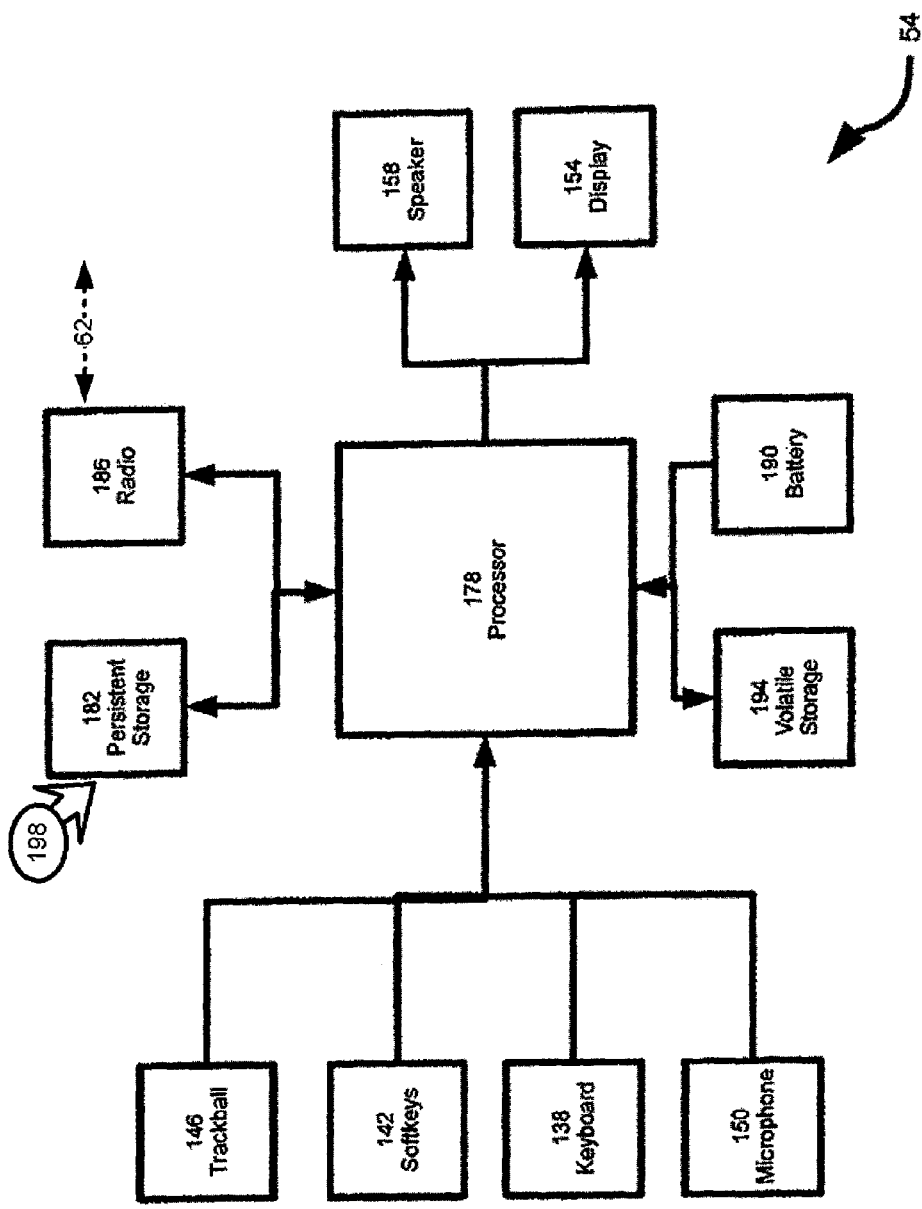
FIG. 2 is a schematic representation of a computing device of FIG. 1.

The structure and features of each client device 54 can vary. However, to provide an example, FIG. 2 shows a block diagram representing exemplary components of client device 54. Client device 54 thus includes a processor 178 which interconnects input mechanisms of client device 54 (e.g. a trackball 146, soft keys 142, keyboard 138, and a microphone 150) and output mechanisms of client device 54 (e.g. a speaker 158, a display 154 and a camera flash 166). Other types of input mechanisms and output mechanisms are contemplated. Processor 178 is also connected to a persistent storage device 182. As discussed earlier, persistent storage device 182 can be implemented using flash memory or the like, or can include other programmable read only memory ("PROM") technology or can include read only memory ("ROM") technology or can include a removable "smart card" or can comprise combinations of the foregoing.

Device 54 also includes a wireless radio 186 that connects wirelessly to access point 62 to provide wireless email, telephony and web-browsing functionality. Client device 54 also includes a battery 190 which is typically rechargeable and provides power to the components of client device 54. In FIG. 2, for simplicity battery 90 is only shown connected to processor 78, but it will be understood that battery 190 is connected to any component (e.g. radio 188 and display 154) within client device 54 that needs power to operate. Client device 54 also includes volatile storage 194, which can be implemented as random access memory ("RAM"), which can be used to temporarily store applications and data as they are being used by processor 178. Collectively, one can view processor 178, volatile storage 194 and persistent storage device 182 and as a microcomputer. It is now apparent that device 54 is based on the structure and functionality of a portable wireless device such as a BlackBerry™ device from Research in Motion Inc., of Waterloo Canada, but it is to be stressed that this is a purely exemplary client device, as client device 54 could also be based on any type of client computing device including portable wireless devices from other manufacturers, desktop computers, laptop computers, cellular telephones and the like.

The microcomputer implemented on client 54 is thus configured to store and execute the requisite BIOS, operating system and applications to provide the desired functionality of client 54. In a present example embodiment, each client maintains at least one push application 198, the details of which will be discussed further below.

Those skilled in the art will now recognize that persistent storage device 182 and volatile storage 194 are each non-limiting examples of computer readable media capable of storing programming instructions that are executable on processor 178.

Referring again to FIG. 1, computing device 54-1 is shown connected to access point 58-1, while computing device 54-$n$ is shown connected to access point 58-$n$, but it is to be understood that either computing device 54 can connect to either access point 58. Furthermore it is to be understood that various configurations are contemplated as to how the infrastructure of each access point 58 is implemented. As a non-limiting example, it is contemplated that where a carrier operates access point 58-1, then that carrier may also issue the subscription to computing device 54-1 that permits computing device 54-1 to connect to access point 58-1. Likewise, it is also contemplated that a carrier that operates access point 58-2 may also issue the subscription to computing device 58-2 that permits computing device 54-2 to connect to access point 58-$n$. The carrier that operates access point 58-1 may be the same or different from the carrier that operates access point 58-$n$. Where different carriers are involved, it will be understood that system 50 contemplates roaming configurations whereby a particular computing device 54 is considered to be roaming if it connects to an access point 58 that is operated by a different carrier. It will also now be understood that more than two computing devices 54, access points 58, and carriers are contemplated in various implementations.

Each link 62 can be based on any wireless protocol, including but not limited to Global System for Mobile communication ("GSM"), General Packet Relay Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), Institute of Electrical and Electronic Engineers (IEEE) standard 802.11, Bluetooth™ or any of their variants or successors. It is also contemplated each computing device 54 can include multiple radios 186 to accommodate the different protocols that may be used to implement each link 62. It is also contemplated that in other example embodiments, one or both access points 58 can be wired access points so that link(s) 62 are also wired. It will now be understood that each access point 58 is configured to communicate with device 54 according to the type of respective link 62, and that in some variations one or both links 62 can be wired.

Each access point 58, in turn is connected to an intermediary infrastructure 66 via links 70. Again, the nature of each link 70 is not particularly limited, and typically corresponds to its type of access point 58. Each link 70 can, for example, be wired as backhaul via a T-carrier link (e.g. T1, T3) or E-carrier link or the like. Intermediary infrastructure 66 in turn is connected to the Internet 74 (or other type of wide area network) via links 78. Links 78 can also be backhaul like links 70. In other configurations, links 70 can themselves be implemented via Internet 74 and thereby obviate the need for a direct connection to intermediary infrastructure 66 from access points 58.

A plurality of content servers 82, in turn, connect to Internet 74 via links 86. Each content server 82 is different from the other, and thus each content server 82 is configured to host different application content 90. The type and nature of application content 90 is not particularly limited. Weather, news and stock prices are three non-limiting examples of application content 90. In system 50, application content 90 from a given content server 82 can be pushed to one or more computing devices 54 via intermediary infrastructure 66. As will be explained further, system 50 is configured such that content 90 pushed from a given content server 82 is only actually received at a computing device 54 that subscribes to that content.

(Another aspect of the flexible nature of system 50 is that system 50 can be configured so that each device 54 can, as part of its subscription, further specify that all of the content 90 from a particular content server 82 is to be pushed, or only a selected portion of content 90 from a particular content server 82 is to be pushed. As an example, assume that content server 82-1 hosts weather information, then content 90-1 can include weather content for different locales. In this example, device 54-1 can be operated so as to indicate via application 198-1 that one particular locale of weather information is to be pushed within content 90-1, while device 54-2 can be operated so as to indicate via application 198-1 another particular locale of weather information that is to be pushed within content 90-1. This feature is not discussed in detail further herein for sake of simplifying explanation of the example embodiments, but those skilled in the art will now recognize how it can be implemented in conjunction with the other teachings of this specification.)

In the exemplary configuration of FIG. 1, content subscription is effected by installing a push application 198 on computing device 54 that uniquely corresponds to specific content 90, and therefore computing device 54-1 is shown as having a first push application 198-1 (which uniquely corresponds to content 90-1) and a second push application 198-n (which uniquely corresponds to content 90-n) installed thereon, while computing device 54-2 is shown as only having first push application 198-1. Thus, according to this exemplary configuration, both content 90-1 and content 90-n can be pushed to device 54-1, but only content 90-1 can be pushed to device 54-n. An example of unique correspondence between an application 198 and particular content 90 can include a push application 198 for weather content 90, whereby the weather push application 198 is configured to generate graphics, text, audio and even video messages according to uniquely formatted weather content 90. By contrast, another push application 198 can uniquely correspond to news content 90, whereby specifically formatted news content 90 may only be generated using the uniquely corresponding news push application 198.

In the example embodiment of FIG. 1, the policing of the subscription of push content is managed in two ways, though other ways are contemplated. First, each content server 82 maintains its own content server policy 94. Second, each intermediary infrastructure 66 maintains its own version of content server policies 94 in the form of local subscription policies 98. Thus, local subscription policy 98-1 corresponds to content server policy 94-1, while local subscription policy 98-n corresponds to content server policy 94-n. Thus, when system 50 is operating without policy conflicts, then policy 94-1 and policy 98-1 indicate that content 90-1 can be pushed to both device 54-1 and device 54-n, while policy 94-n and policy 98-n indicate that content 90-n can only be pushed to device 54-1. When policy conflicts arise it is possible that a given content server 82 may attempt to improperly push content 90 to a device 54 that has not subscribed to that content 90, in which case intermediary infrastructure 66 is configured to block that pushed content 90, such that it never arrives at that non-subscribed device 54.

There are a number of ways to implement intermediary infrastructure 66, however a specific intermediary infrastructure 66 is presently contemplated, whereby intermediary infrastructure 66 includes at least one gateway 200, at least one mediation server 204, at least one policy server 208, and at least one Internet firewall 212. In FIG. 1, a plurality of gateways 200 are employed, whereby one gateway 200 connects to a corresponding access point 58 via a corresponding link 70. Likewise, as shown in FIG. 1, a plurality of mediation servers 204 and a plurality of policy servers 208 are also employed.

Mediation servers 204 are configured to connect device 54 to a range of applications or services (not shown herein but which can include, for example, web-browsing for devices 54, mapping applications for devices 54, or location based services for devices 54) including the push data service available from content servers 82 that are contemplated herein. Where such other applications or services are not provided, then mediation server 204 can be omitted altogether.

Policy servers 208 implement policies 98 as discussed generally above and in more detail below.

In the presently contemplated configuration, gateway 200-1, mediation server 204-1, policy server 208-1 and firewall 212-1 are substantially dedicated to traffic associated with access point 58-1, while gateway 200-n, mediation server 204-n, policy server 208-n and firewall 212-n are substantially dedicated to traffic associated with access point 58-n. This presently contemplated configuration is believed to assist with load balancing. Cross connections between each gateway 200, mediation server 204, and policy server 208 permit traffic to be carried by either set in the event of failure of one set. Accordingly, gateway 200-1, mediation server 204-1, policy server 208-1 and firewall 212-1 can be configured to expect to manage traffic associated with computing device 54-1 (rather than computing device 54-n), so that, for example, the portion of policies 98-1 and 98-n that are relevant to computing device 54-1 are primarily active in policy server 208-1, while the portion of policies 98-1 and 98-n that are relevant to computing device 54-n are primarily active in policy server 208-n; however, in the event that a computing device 54 were to roam so as to connect to another access point 58, the policing function of intermediation infrastructure 66 can continue. For example, if computing device 54-1 were to connect to access point 58-n, then policy server 208-n can access policy server 208-1 in order to obtain the portion of policies 98-1 and 98-n that are relevant to computing device 54-1. It will now be understood that this configuration can be scaled to thousands or millions of computing devices 54 and hundreds or thousands of access points 58. By the same token it will now be understood that this configuration can be particularly useful when access points 58 are located far from each other, such as in different cities, countries or continents.

Intermediation infrastructure 66 can also be configured to encrypt content 90 that is pushed to each computing device 54. For example, policy servers 208 can be configured such that all communications over Internet 74 between policy servers 208 and content servers 82 are encrypted. Unique public and private key pairs deployed between each policy server 208 and each content server 82 can be used to effect such encryption. Likewise, gateways 200 and devices 54 can be configured such that all communications therebetween via access point 58 are encrypted. Unique public and private key pairs between each computing device 54 and each gateway 200 can be used to effect such encryption. Furthermore, encryption can be included between subscribing computing devices 54 and content servers 82 so that the ultimate payload of any content 90 destined for the subscribing computing device 54 is encrypted along the entire pathway between content servers 82 and computing devices 54, even though addressing information and other header information associated with content 90 remains accessible to policy servers 208 so that appropriate policies 98 can be applied to that content 90 and routing of that content 90 can be effected.

In one non-limiting specific example, according to the BlackBerry™ infrastructure from Research in Motion Ltd. of Waterloo, Ontario, Canada, computing devices 54 can be implemented as BlackBerry™ devices; gateways 200 can be implemented as a suitable variation of the Relay component of the BlackBerry™ infrastructure; and mediation servers 204 can be implemented as a suitable variation of the Mobile Data Services (MDS) servers of the BlackBerry™ infrastructure.

While not shown in FIG. 1, system 50 can additionally include other intermediation components, such as an enterprise mediation server that resides along link 70-1, or an internet mediation server that resides along link 70-1. In a non-limiting example, such an enterprise mediation server can be implemented using a BlackBerry™ Enterprise Server (BES) according to the BlackBerry™ infrastructure while an internet intermediation server can be implemented using a BlackBerry™ Internet Server (BIS) according to the BlackBerry™ infrastructure.

In variations, such as implementations that are not based on the BlackBerry™ infrastructure, then gateway 200 and policy server 208 can be implemented as a single computing device, and mediation server 204 can be omitted altogether if desired.

Figure 3:
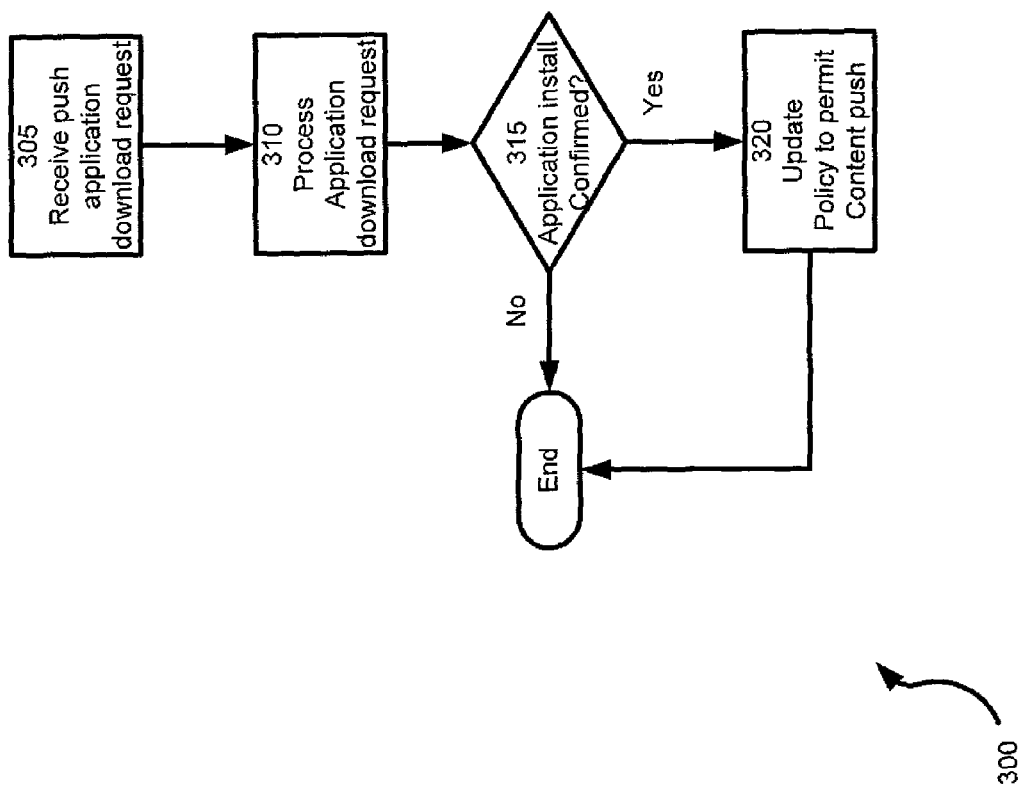
FIG. 3 shows a flowchart depicting a method for managing push content policy.

Referring now to FIG. 3, a method for managing push content policies is represented in the form of a flowchart and indicated generally at 300. Method 300 can be implemented using system 50 or variations thereof. Method 300 can also be implemented by policy server 208 or content server 82 or both. In a present example embodiment method 300 is implemented by both, although with appropriate contextual modifications thereto.

Block 305 comprises receiving a request for a push application to be downloaded. Such a request originates from a device 54. The request indicates which push application 198 is being requested; in the present example of FIG. 1, the request thus specifically originates from either device 54-1 or device 54-n, and indicates a request to download either push application 198-1 or push application 198-n.

As a first illustrative example, assume that computing device 54-n sends a request to policy server 204-n to download application 198-n. When block 305 is performed by policy server 204-n, it will receive that request.

Block 310 comprises processing the application download request that is received at block 305. Continuing with the first illustrative example, when block 310 is performed by policy server 204-n, it will facilitate the downloading of push application 198-n to the requesting device 54-n. Such facilitation can take the form of forwarding the download request to any server (such as content server 82-n, or a more general application download server) that hosts a downloadable copy of push application 198-n, so that a copy of application 198-n is downloaded onto device 54-n.

Block 315 comprises confirming whether the application was actually installed on the device that originated the request received at block 305. Block 315 can be effected on policy server 204-n by policy server 204-n waiting for an acknowledgement message to be sent from the requesting device that signals confirmation that the requested application was actually installed on the requesting device. Continuing with the first illustrative example, application 198-n can be configured so that upon completion of installation device 54-n, or at run-time on device 54-n, an acknowledgement message is sent from device 54-n to the policy server 204-n confirming that application 198-n was actually installed on device 54-n. In this instance a "yes" determination is made at block 315 which leads to block 320, at which point policy 98-n maintained on policy server 204-n is updated to that push content 90-n can be pushed from content server 82-n to device 54-n. If no such acknowledgement is ever received by policy server 204-n, then a "no" determination is made at block 315 which leads method 300 to end.

Figure 4:
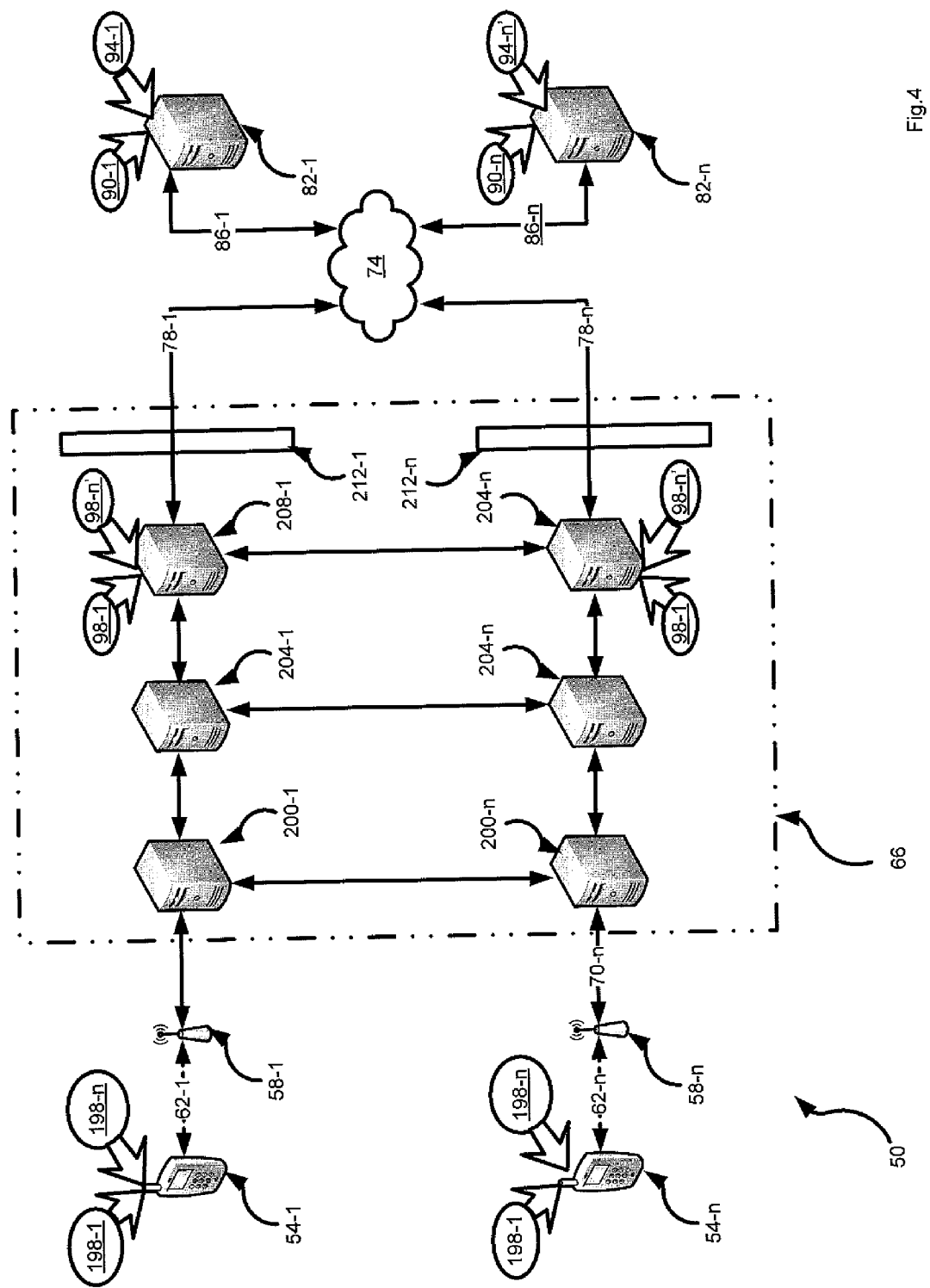
FIG. 4 shows the system of FIG. 1 after performance of an illustrative example of the performance of the method of FIG. 3.

FIG. 4 shows the results of a "yes" determination at block 315 according to the first illustrative example, whereby application 198-n is now installed on device 54-n, and policy 98-n now bears the reference 98-n', the apostrophe ("'") indicating that policy 98-n was updated at block 320, and that the updated policy 94-n' now indicates that server 82-n is authorized to push content 90-n to device 54-n.

As discussed, a suitable contextual variation of method 300 is also performed by content servers 82. In the first illustrative example, when block 320 is reached by server 82-n, then policy 94-n is updated, so that in FIG. 4, policy 94-n now bears the reference 94-n', the apostrophe ("'") indicating that policy 94-n was updated at block 320 by server 82-n, that updated policy 94-n' now indicating that server 82-n should push content 90-n to device 54-n.

The contextual variation of method 300 for content servers 82 depends in part on whether servers 82 are actually hosting the downloading of the push application 198, or not. Where the content server 82 is not hosting the actual downloading, the blocks 305 and 310 can be omitted for content server 82, such that only block 315 and block 320 remain.

In more general terms, it should also be understood that method 300 can be varied such that the decision at block 315 can be based on any validation originating from or associated with the requesting device 54 that the pushing of content 90 from a particular server 82 to that requesting device 54 is authorized.

Figure 5:
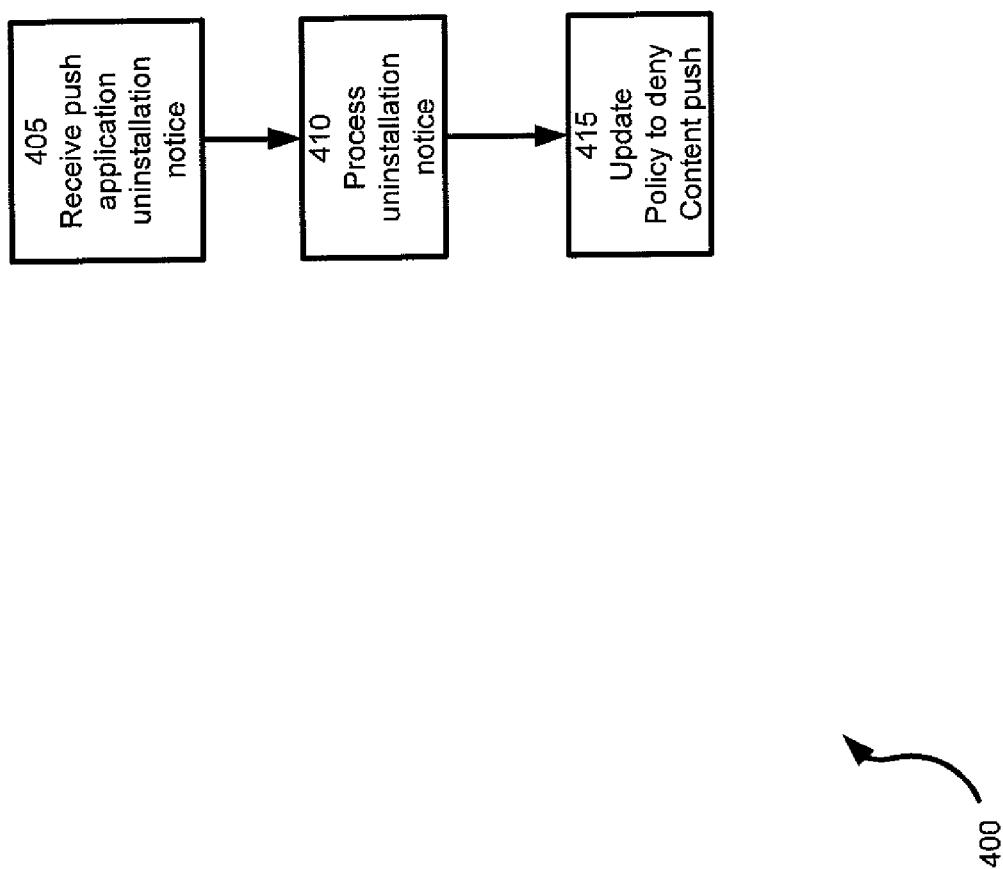
FIG. 5 shows a flowchart depicting another method for managing push content policy.

Referring now to FIG. 5, another method for managing push content policy is represented in the form of a flowchart and indicated generally at 400. Method 400 can be implemented using system 50 or variations thereof. Method 400 can also be implemented by policy server 208 or content server 82 or both. In a present example embodiment method 400 is implemented by both, although with appropriate contextual modifications thereto.

While method 300 involved the updating of a policy so as to permit push content, method 400 in contrast is a method to update a policy so as to deny push content. Thus, block 405 comprises receiving a notice that a particular push application has been uninstalled from a particular device. In a second illustrative example, assume that method 300 has already been performed using the first illustrative example. Also in this second illustrative example, assume that device 54-n has uninstalled push application 198-n therefrom. Push application 198-n, or some other application in device 54-n, is thus configured to send a notification from device 54-n to policy server 208-n notifying policy server 208-n of the uninstallation. At block 410, the uninstallation notice is processed at policy server 208-n. Block 410 can include sending a notification of the uninstallation onto the content server 82-n, so that content server 82-n can likewise perform its own local version of method 400 and thereby update its local policy to cease further pushing of content 90-n to device 54-n. Block 415 comprises the actual updating of the policy to indicate that pushing of content 90-n to device 54-n is to occur no longer.

Implementing block 415 on policy server 208-n results in policy server 208-n reverting to policy 98-n (as originally shown in FIG. 1) from policy 98-n' (as shown in FIG. 4). Likewise implementing block 415 on content server 82-n results in content server 82-n reverting to policy 94-n (as originally shown in FIG. 1) from policy 94-n' (as shown in FIG. 4). Upon completion of method 400 in both server 204-n and server 82-n using the second illustrative example, system 50 returns to the state shown in FIG. 1.

Figure 6:
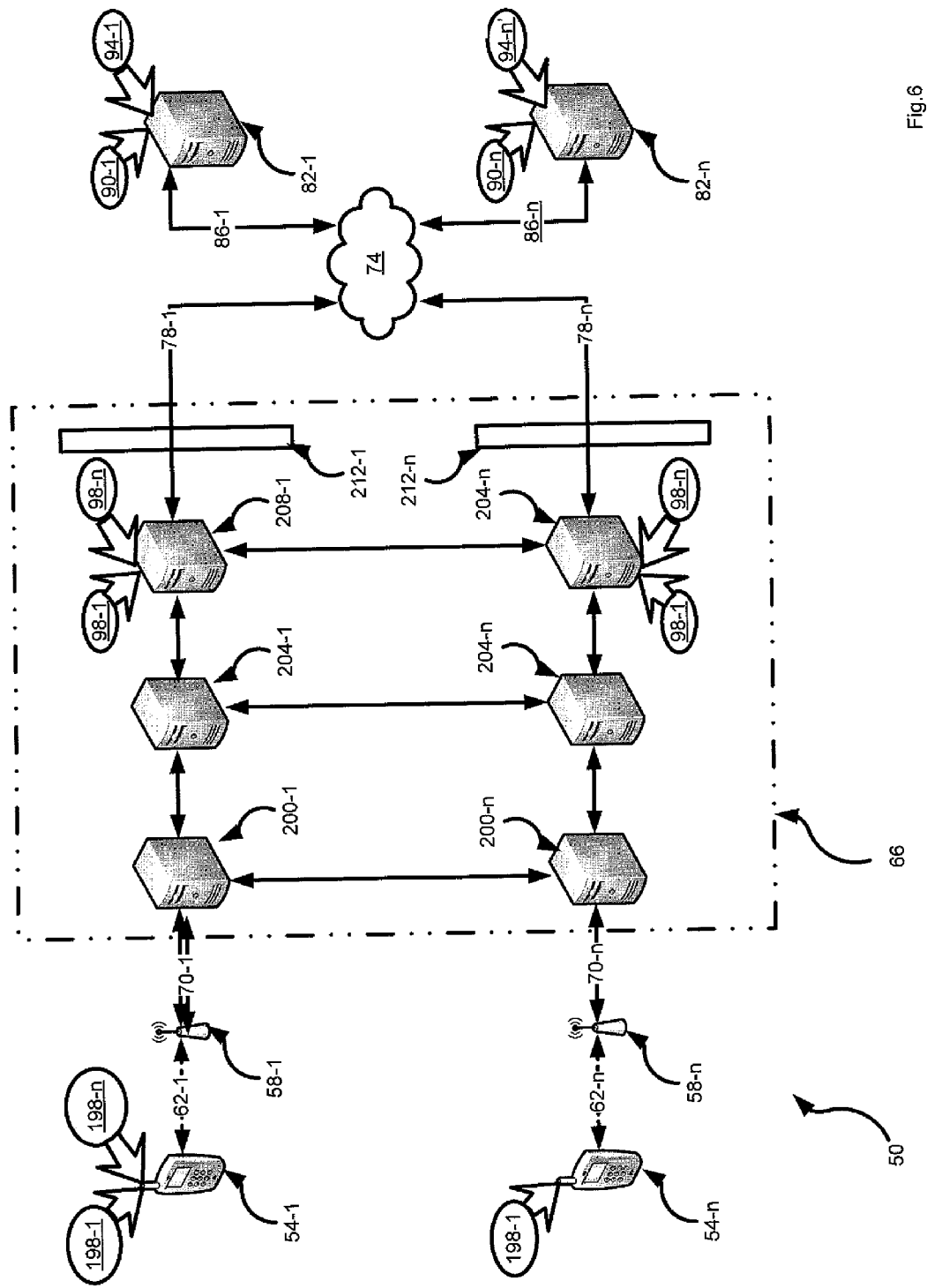
FIG. 6 shows the system of FIG. 1 according to an illustrative example whereby the push content policies are not synchronized.

It is contemplated that it can occur, however, that policies 98 can become unsynchronized with policies 94. For example, in the second illustrative example, if it were to occur that method 400 only occurred on server 204-n, but did not occur on server 82-n, then the situation could arise where server 82-n would attempt to continue to push content 90-n to device 54-n without authorization. FIG. 6 illustrates this scenario which will be referred to herein as the third illustrative example. In FIG. 6, policy 94-n' remains on server 82-n, thereby indicating that push content 90-n is to be forwarded to device 54-n. However, push application 198-n has been removed from device 54-*n*, and policy 98-*n* indicates that push content 90-*n* is not authorized for delivery to device 54-*n*.

Figure 7:
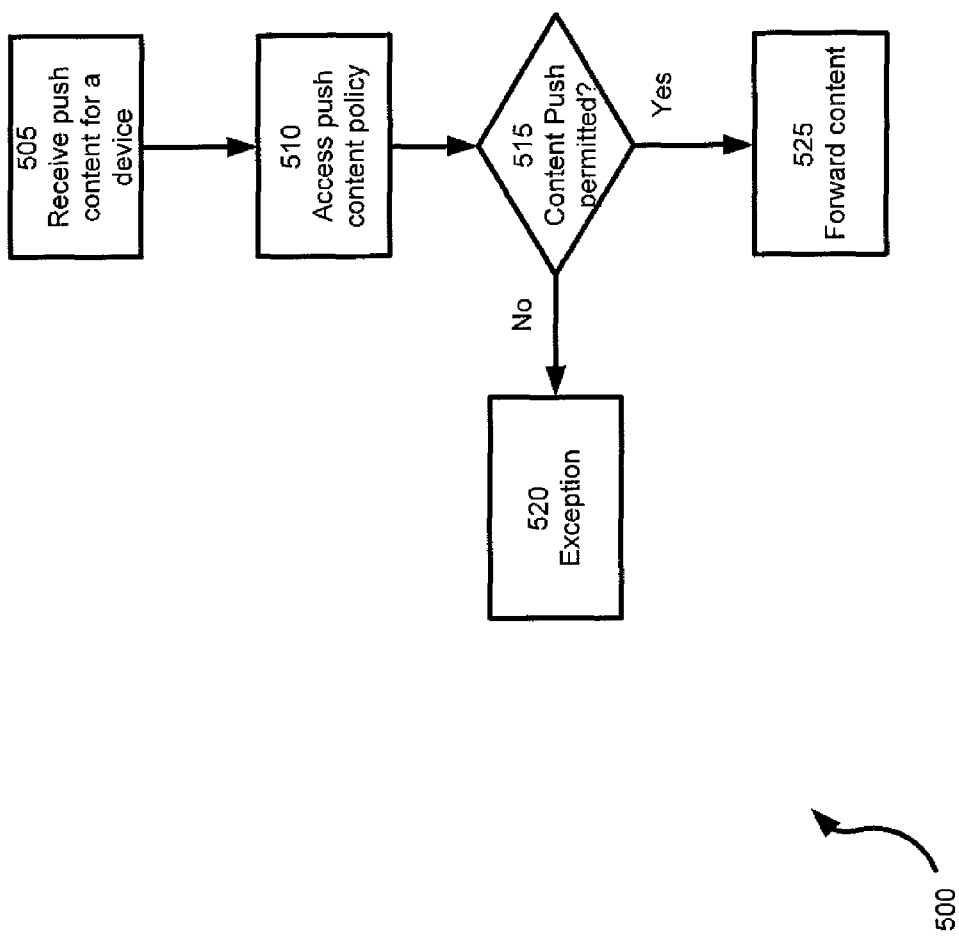
FIG. 7 shows a flowchart depicting a method for managing push content policy.

Referring now to FIG. 7, a method for managing push content is represented in the form of a flowchart and indicated generally at 500. Method 500 can be implemented using system 50 or variations thereof. For example, method 500 can also be implemented by policy server 208. Method 500 comprises policy server 208 receiving push content that is addressed to a particular device and determining whether delivery of that push content is authorized, and forwarding the push content or refusing to forward it, accordingly. According to the third illustrative example in FIG. 6, assume that content server 82-*n* attempts to send content 90-*n* to device 54-*n*. Thus, block 505 comprises receiving push content 90-*n* destined for device 54-*n*. Block 510 comprises accessing policy 98-*n*, and block 515 comprises determining if attempted push of content at block 505 is consistent with the policy accessed at block 510. According to the third illustrative example, a "no" determination will be reached at block 515 resulting in exception block 520. The exception block 520 includes dropping the push content received at block 505 so that it is never sent to device 54-*n*. Returning again to block 520, the exception generated at block 520 can also include a message to the content server 82 that attempted to send the unauthorized push content 90. The message can indicate that the content server 82 should update its policy 94 so that further attempts to push content 90 to the unauthorized device 54 do not occur. The exception generated at block 520 can also include a penalty whereby a daily allotment (e.g. as expressed in bytes) of content 90 that is permitted to be pushed to devices 54 is decremented, even though the content 90 itself was never actually forwarded to the device 54. The exception generated at block 520 can further include maintaining a record of the number of times a particular content server 82 attempts to send unauthorized push content 90, and upon exceeding a predefined number of times, instructing firewall 212 to temporarily, or even permanently, block that content server 82 from being able to send traffic to intermediation infrastructure 66.

Conversely, it will now be understood that a "yes" determination will be reached at block 515 any time that the policy 98 accessed by the policy server 208 confirms that delivery of push content 90 to a particular device 54 is permitted, which thereby leads to block 525 and causing that content 90 to be forwarded. Subsequent to block 525, method 500 can be enhanced such that when policy server 208 receives confirmation of delivery of push content 90 to the destination device 54, then policy server 208 will in turn send a confirmation of delivery back to the originating push content server 82.

Having read the foregoing, it should now be understood that variations, subsets or combinations or all of them are contemplated. For example, it is contemplated that policy 98 and policy servers 204 can be configured to include more than simple "yes" or "no" determinations as to whether or not to send content 90 to a particular device 54. For example, each application 198 can be configured to allow specification of conditions for delivery of content 90. Such conditions can include, by way of non-limiting examples: a) "Suspend delivery of content while device is roaming"; or b) "If roaming, only send text content and strip all other content"; or c) "Only send content during these specified times of day". As another example, intermediation infrastructure 66 can be configured to maintain data regarding the hardware and software capabilities of a particular device 54, and automatically transcode pushed content 90 from a format that originates from the content server 82 into another format that is particularly suitable for the capability of that particular device 54.

As another example, it is to be understood that while the foregoing contemplate push applications 198 that uniquely correspond to a particular push content 90, in other example embodiments it is contemplated that one push application 198 can be configured to accept push content 90 from a plurality of different content servers 82 that host different push content 90.

It is to be understood that each server 82, 200, 204, 208, can be implemented using an appropriately configured hardware computing environment, comprising at least one processor, volatile storage (e.g. random access memory), non-volatile storage (e.g. hard disk drive), and at least one network interface all interconnected by a bus. Other components can also be connected to the processor via the bus, such as input mechanisms and output mechanisms. Likewise it is to be understood that the hardware computing environment of any particular server is configured to execute an operating system and other software such that the servers are ultimately configured to perform according to the teachings herein. Furthermore, it will be understood that each server can itself be implemented as several different servers, or alternatively one or more servers in FIG. 1 can be consolidated into a single server.

Figure 8:
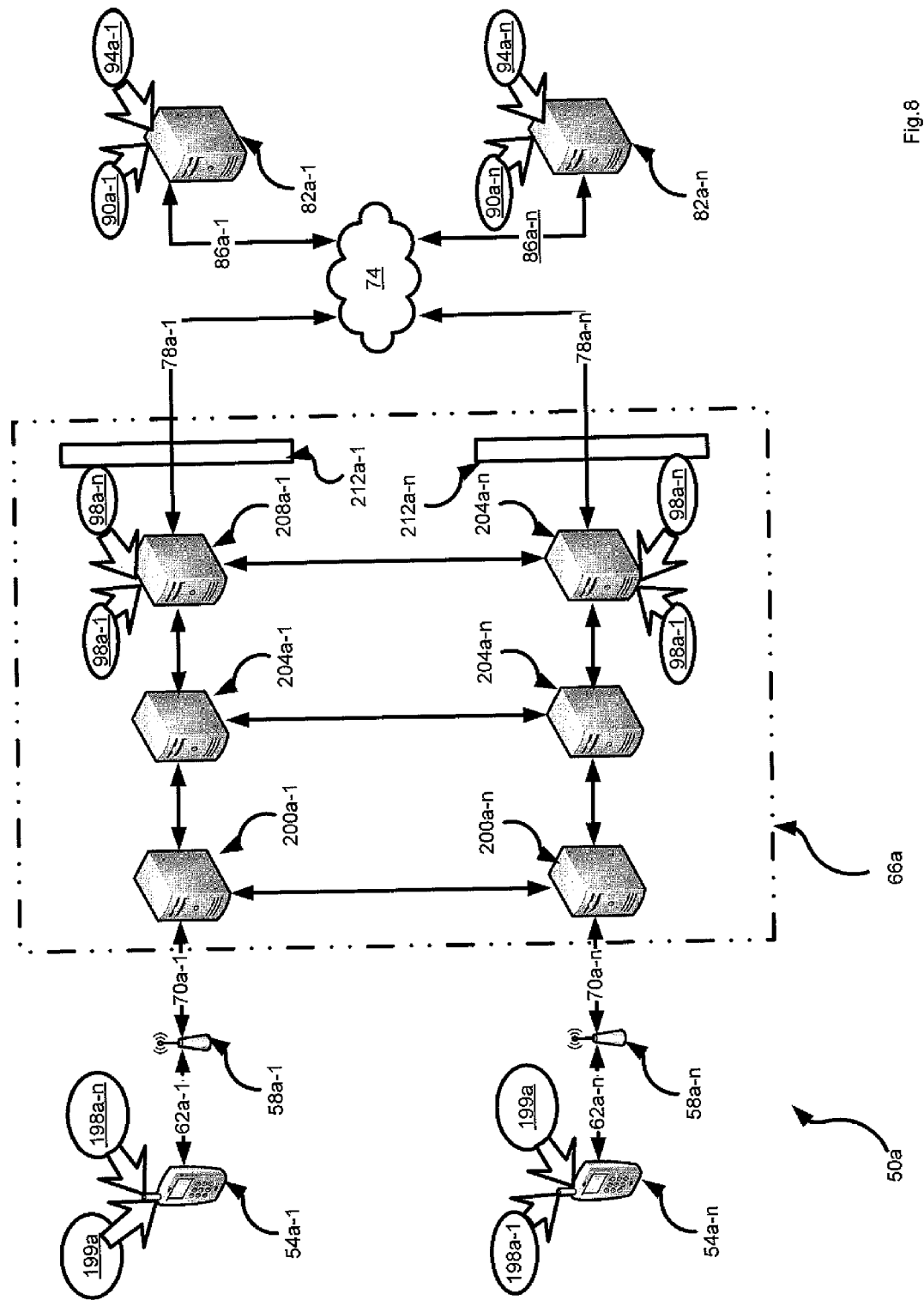
FIG. 8 shows a schematic representation of a system for management of push content when changing a computing device.
Figure 9:
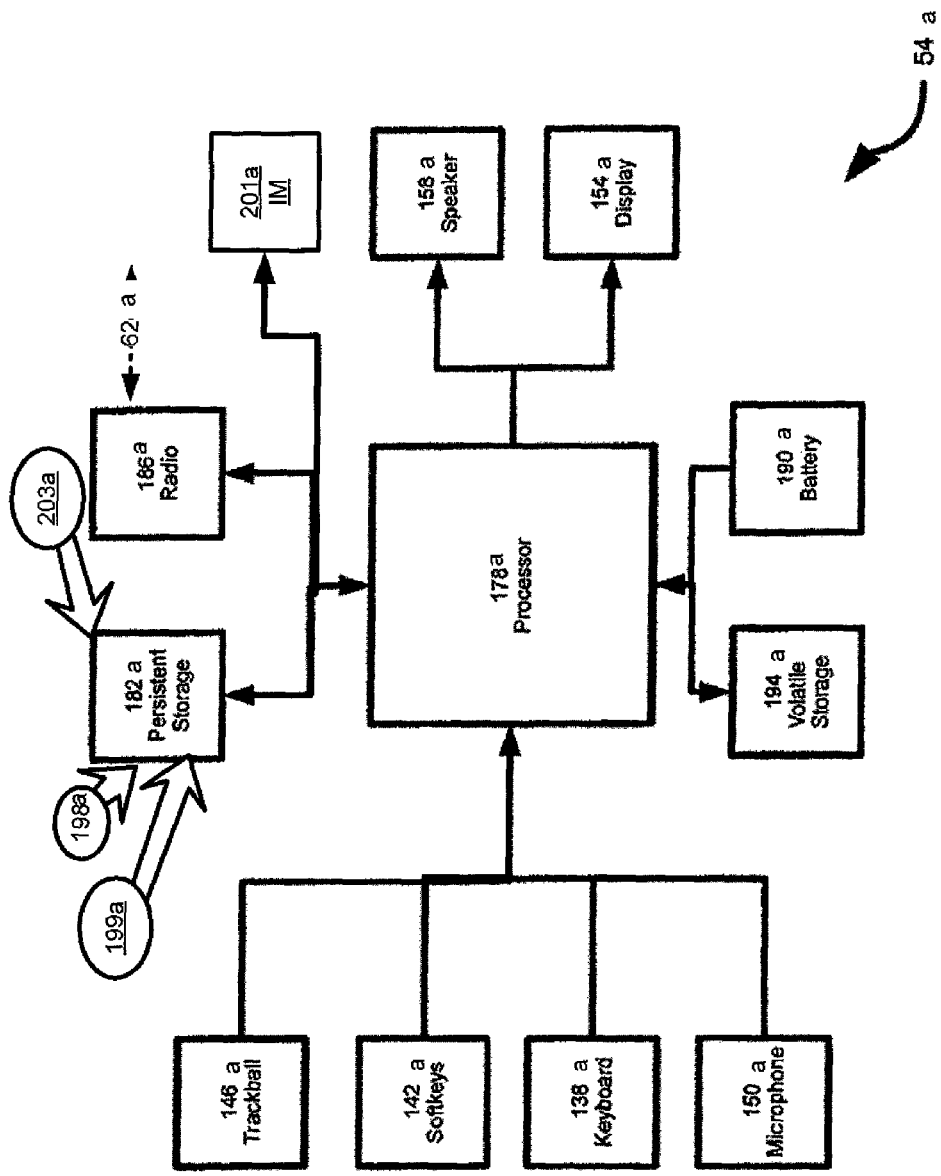
FIG. 9 shows a schematic representation of the computing device of FIG. 8.

Referring now to FIG. 8, a system for management of push applications when changing computing devices is indicated generally at 50*a*. System 50*a* comprise many of the same components as system 50, and accordingly like elements bear like references except followed by the suffix "a". Of note is that in system 50*a*, and as also shown in FIG. 9 (which shows a schematic representation of the computing device of FIG. 8), each device 54*a* maintains an identifier tracking application 199*a* that is executable on processor 178*a*. Identifier tracking application 199*a* makes use of a relative device identifier stored on an information module 201*a*, as well as an absolute device identifier 203*a* stored in persistent storage 182*a*.

Each device 54*a* also comprises a slot for receiving removable information module 201*a*. As information module 201*a* is removable, different information modules 201*a* can be inserted into each device 54*a*. Information module 201*a* can be implemented as a subscriber information module (SIM) card or the like. Those skilled in the art will now recognize that information module 201*a* can maintain a relative device identifier, whereby when information module 201*a* is inserted within a particular device 54*a*, then system 50*a* can manage communications with device 54*a* by using that relative device identifier. The relative device identifier of information module 201*a* is unique to information module 201*a*, such that when information module 201*a* is moved to a different device 54*a*, then communications associated with that relative device identifier follow to that different device 54*a*. Well-known relative device identifiers that are commonly stored on SIM cards include an International Mobile Subscriber Identity (IMSI) or a Mobile Subscriber Integrated Services Digital Network Number (MSISDN).

Each device 54*a* thus also maintains at least one absolute device identifier 203*a* within persistent storage 203*a*. Thus, absolute device identifier 203*a* can comprise one or more of an International Mobile Equipment Identity (IMEI), and a serial number. Where device 54*a* originates from a single manufacturer or business entity, then the absolute device identifier 203*a* can be a serial number or the like that is assigned by that business entity. As a specific example, where device 54 is based on a BlackBerry® smartphone originating from Research in Motion Ltd. of Waterloo, Ontario Canada, then the absolute device identifier 203a can be a BlackBerry® smartphone PIN number. Again, absolute device identifier 203a can be one or more or all of these.

Figure 10:
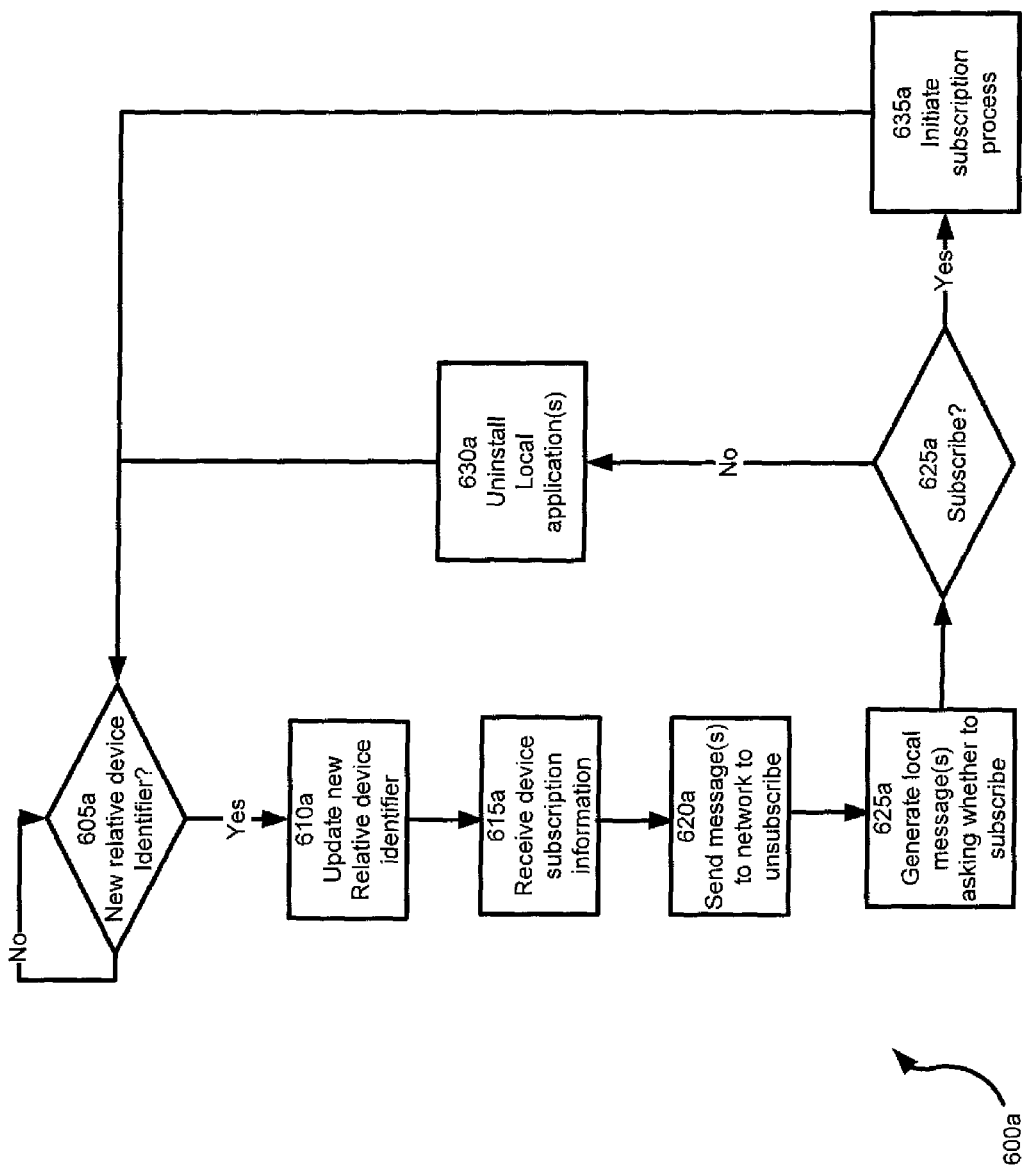
FIG. 10 shows a depicting a method for managing push content when changing a computing device.

Referring now to FIG. 10, a method for managing push content when changing devices is represented in the form of a flowchart and indicated generally at 600a. In a present example embodiment, method 600a can reflect one way of implementing identifier tracking application 199a which is loadable from persistent storage 182a and executable locally on processor 178a.

Block 605a comprises determining whether a new relative device identifier has become associated with device 54a. In a present example embodiment, block 605a comprises processor 178a loading a relative device identifier from information module 201a. If block 605a is performed on initial provisioning of device 54a, then a "yes" determination is made at block 605a. Alternatively, if a first information module 201a is removed from device 54a and replaced with a second, different information module 201a then a "yes" determination will also be made at block 605a. However, if there is no change in information module 201a during various cycling of method 600a, then a "no" determination is made at block 605a and block 605a loops back to itself.

Block 610a comprises updating a storage location in either persistent storage 182a or volatile storage 194a or both that reflects the relative device identifier as loaded from information module 201a. The storage of the relative device identifier can then be used during subsequent cycling through block 605a in order to make a "yes" or "no" determination as previously described.

Block 615a comprises receiving device subscription information. Taking the specific example shown in FIG. 8, assume that method 600a is being performed on device 54a-1, and therefore assume that application 198a-n is stored on device 54a-1, and accordingly server 82a-n is configured to send content 90a-n to device 54a-1 as previously described. Now also assume that a new information module 201a has subsequently been installed in device 54a-1, thereby bringing method 600a to block 615a. According to this specific example, at block 615a then processor 178a will ascertain that application 199a-n is loaded onto device 54a-1, and subscription information associated therewith (e.g. the identity of server 82a-n, etc.) will be received by processor 178a.

At block 620a, a message will be sent over link 62a-1 to appropriate components connected thereto indicating that subscriptions, as gathered at block 615a, are to be terminated. Continuing with the specific example of device 54a-1 as previously described in relation to block 615a, at block 620a processor 178a will send a message to either server 208a-1 or server 204a-n or server 82a-n or all of them indicating that polices 98a-n and policies 94a-n should be updated to indicate that device 54a-1 has unsubscribed from receiving push content 90a-n. The message can include the at least one absolute identifier 203a as well as an identification of push content 90a-n. The message can optionally, though need not contain, an identification of the original relative device identifier that existed prior to the "yes" determination at block 605a. Where there are multiple applications 199a stored on device 54a, then block 620a can comprise sending multiple messages to indicate an instruction to unsubscribe for each different type of push content 90a associated with each of the applications 199a. Block 620a can thus comprise, as a non-limiting example, performance of block 415 of method 400.

Block 625a comprises generating a local message on device 54a, possibly in the form of a querying dialog box on display 154a, asking to receive input via trackball 146a, soft keys 142a, or keyboard 138a or via any one or all of them, as to whether or not applications that were detected on device 615a should be removed, or whether new subscriptions that are associated with the new information module 201a should be established.

Device 54a is therefore configured to wait for input at block 625a responsive to the local message generated at block 625a. A "no" determination at block 625a leads to block 630a whereby the local applications 199a detected at block 615a are deleted from device 54a. A "yes" determination at block 625a leads to block 635a whereby the subscription process for each of those applications 199a is performed. Block 635a can thus comprise, as a non-limiting example, performance of block 320 of method 300.

Variations, subsets, and combinations are contemplated. For example, in relation to method 600a, block 625a and block 630a and block 635a and block 640a can be omitted from method 600a, such that method 600 cycles directly back from block 620a to block 605a. As another example, it should emphasized that while system 50a is described in relation to an infrastructure for a BlackBerry® smartphone, system 50a can be modified to work on other infrastructures where intermediary infrastructure 66a is modified or even eliminated. System 50a can be modified to function independently of methods 300, 400 and 500, and by extension obviate utilization of profile 98a or profile 94a, but still be associated with various types of push content 90a on servers 82a: e.g. intermediary infrastructure 66a can be eliminated such that only a content server policy 94a is used to manage whether or not to delivery push content 90a to a given device 54a.

The invention claimed is:

1. A method for management of push content on a computing device comprising:
    determining, at a processor of the computing device, that a relative device identifier associated with the computing device has changed;
    receiving, at the processor, content subscription information; the content subscription information identifying content to be pushed to the computing device via a link connected to the computing device; the content subscription information maintained within at least one storage device of the computing device;
    sending at least one message to a network component instructing the network component to unsubscribe the computing device from the content to be pushed; the message identifying an absolute identifier associated with the device and the content.

2. The method of claim 1 further comprising:
    generating a local message on an output mechanism of the device requesting input to identify whether to re-subscribe to the content;
    on receiving an affirmative response to the local message via an input mechanism of the device, initiating a subscription process to the network component to re-subscribe the computing device to receive the content to be pushed.

3. The method of claim 2 further comprising:
    on receiving a negative response to the local message via the input device, uninstalling an application from the storage device; the application configured to receive the content via the network component and to generate the content on the output mechanism.

4. The method of claim 1 wherein the network component is a policy server in an intermediation infrastructure; the policy server connected to a content server for hosting the content; the policy server configured to maintain a policy indicating whether delivery of the push content to the computing device is permitted.

5. The method of claim 1 wherein the network component is a content server for hosting the content; the content server configured to maintain a policy indicating whether delivery of the push content to the computing device is permitted.

6. The method of claim 1 wherein the determining is performed by detecting whether a removable information module within the computing device has been changed.

7. The method of claim 6 wherein the removable information module is a Subscriber Information Module (SIM) card.

8. A computing device comprising:
    storage configured to maintain a relative device identifier; the relative device identifier changeable;
    the storage configured to maintain an absolute device identifier that is not changeable;
    the storage further configured to maintain content subscription information identifying content to be pushed to the computing device via a link connectable to the computing device;
    a processor connected to the storage; the processor configured to determine that the relative device identifier has changed;
    the processor further configured to receive the content subscription information;
    the processor further configured to send to at least one message to network component connectable to the link; the message instructing the network component to unsubscribe the computing device from the content to be pushed; the message identifying the absolute device identifier.

9. The computing device of claim 8 further comprising an output mechanism connected to the processor and an input mechanism connected to the processor and wherein the processor is further configured to:
    generate a local message on the output mechanism of the device requesting input to identify whether to re-subscribe to the content;
    receive an affirmative response to the local message via an input mechanism of the device, whereupon the processor is configured to initiate a subscription process to the network component to re-subscribe the computing device to receive the content.

10. The computing device of claim 9 wherein the processor is further configured to:
    receive a negative response to the local message via the input device, and uninstall an application from the storage; the application executable by processor to configure the processor to receive the content via the network component and to generate the content on the output mechanism.

11. The computing device of claim 8 wherein the network component is a policy server in an intermediation infrastructure; the policy server connected to a content server for hosting the content; the policy server configured to maintain a policy indicating whether delivery of the push content to the computing device is permitted.

12. The computing device of claim 8 wherein the network component is a content server for hosting the content; the content server configured to maintain a policy indicating whether delivery of the push content to the computing device is permitted.

13. The computing device of claim 8 further comprising a removable information module within the computing device and the processor is configured to determine that the relative device identifier has changed by detecting whether the removable information module has changed.

14. The computing device of claim 13 wherein the removable information module is a Subscriber Information Module (SIM) card.

15. A system for management push content comprising:
    a network component for pushing content and connectable to a network;
    a computing device connectable to the server via the network;
    the computing device comprising storage configured to maintain a relative device identifier; the relative device identifier changeable;
    the storage configured to maintain an absolute device identifier that is not changeable;
    the storage further configured to maintain content subscription information identifying content to be pushed to the computing device from the network component;
    the computing device comprising connected to the storage; the processor configured to determine that the relative device identifier has changed;
    the processor further configured to receive the content subscription information;
    the processor further configured to send to at least one message to the network component via the network; the message instructing the network component to unsubscribe the computing device from the content to be pushed; the message identifying the absolute device identifier.

16. The system of claim 15 wherein the computing device further comprises an output mechanism connected to the processor and the computing device further comprises an input mechanism connected to the processor and wherein the processor is further configured to:
    generate a local message on the output mechanism of the device requesting input to identify whether to re-subscribe to the content;
    receive an affirmative response to the local message via an input mechanism of the device, whereupon the processor is configured to initiate a subscription process to the network component to re-subscribe the computing device to receive the content.

17. The system of claim 16 wherein the processor is further configured to: receive a negative response to the local message via the input device, and to uninstall an application from the storage; the application executable by processor to configure the processor to receive the content via the network component and to generate the content on the output mechanism.

18. The system according to claim 15 wherein the network component is a policy server in an intermediation infrastructure; the policy server connected to a content server for hosting the content; the policy server configured to maintain a policy indicating whether delivery of the push content to the computing device is permitted.

19. The system according to claim 15 wherein the network component is a content server for hosting the content; the content server configured to maintain a policy indicating whether delivery of the push content to the computing device is permitted.

20. The system according to claim 15 wherein the computing device further comprises a removable information module within the computing device and the processor is configured to determine that the relative device identifier has changed by detecting whether the removable information module has changed.

* * * * *